United States Patent
Charters et al.

(10) Patent No.: US 9,930,610 B2
(45) Date of Patent: *Mar. 27, 2018

(54) DYNAMIC GENERATION OF GEOGRAPHICALLY BOUND MANET IDS

(71) Applicant: International Business Machines Corporation, Armonk, NY (US)

(72) Inventors: Graham C. Charters, Southampton (GB); Bret W. Dixon, South Perth (AU); Benjamin T. Horwood, North Perth (AU); Alexander H. Poga, Peppermint Grove (AU); Mark A. Shewell, Perth (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/183,825

(22) Filed: Jun. 16, 2016

(65) Prior Publication Data

US 2017/0215212 A1    Jul. 27, 2017

Related U.S. Application Data

(63) Continuation of application No. 15/005,482, filed on Jan. 25, 2016.

(51) Int. Cl.
*H04W 24/00* (2009.01)
*H04W 48/08* (2009.01)
(Continued)

(52) U.S. Cl.
CPC .......... *H04W 48/08* (2013.01); *H04W 64/003* (2013.01); *H04W 84/18* (2013.01)

(58) Field of Classification Search
CPC .. H04W 76/021; H04W 64/006; H04W 84/18
(Continued)

(56) References Cited

U.S. PATENT DOCUMENTS

| 7,881,238 B2* | 2/2011 | Krantz ................. H04W 84/18 370/230 |
| 7,890,124 B2 | 2/2011 | Smith et al. |

(Continued)

FOREIGN PATENT DOCUMENTS

| CN | 102291448 B | 10/2013 |
| WO | 2009018835 A1 | 2/2009 |
| WO | 2012051078 A1 | 4/2012 |

OTHER PUBLICATIONS

IBM, "List of IBM Patents or Patent Applications Treated as Related (Appendix P)," Oct. 3, 2016, p. 1-2.

(Continued)

*Primary Examiner* — Amancio Gonzalez
(74) *Attorney, Agent, or Firm* — Michael O'Keefe

(57) ABSTRACT

A method for generating a geographically-bound mobile ad hoc network identification. The method may include receiving, by a processor, a mobile ad hoc network request. The method may also include determining a plurality of geographic coordinates of a device associated with a current location of the device. The method may further include generating a mobile ad hoc network identification based on the determined plurality of geographic coordinates. The method may also include processing the received mobile ad hoc network request using the generated mobile ad hoc network identification.

9 Claims, 6 Drawing Sheets

(51) Int. Cl.
   *H04W 84/18*          (2009.01)
   *H04W 64/00*          (2009.01)
(58) Field of Classification Search
   USPC ..................................................... 455/456.2
   See application file for complete search history.

(56) References Cited

U.S. PATENT DOCUMENTS

| | | | |
|---|---|---|---|
| 8,340,690 B2* | 12/2012 | Wong | H04W 4/02 |
| | | | 455/456.3 |
| 8,462,644 B2 | 6/2013 | Kneckt et al. | |
| 8,797,916 B2 | 8/2014 | Sadok et al. | |
| 9,294,886 B2* | 3/2016 | Anchan | H04W 4/08 |
| 2002/0039357 A1 | 4/2002 | Lipasti et al. | |

OTHER PUBLICATIONS

Charters et al., "Dynamic Generation of Geographically Bound MANET IDs," Application and Drawings, filed on Jan. 25, 2016, 33 Pages, U.S. Appl. No. 15/005,482.

Jain et al., "Intelligent Computing, Communication and Devices," Proceedings of ICCD 2014, 2015, 535 Pages, vol. 2, Springer India, http://www.springer.com/us/book/9788132220084?countryChanged=true, Accessed on Jan. 11, 2016, Abstract Only.

Khalid et al., "Design and Implementation of ID based MANET Auto-configuration Protocol," International Journal of Communication Networks and Information Security (IJCNIS), Dec. 2013, p. 141-151, vol. 5, No. 3.

Lim et al., "MANET ID : Improvement on Group Communications and ZRP," Second International Conference on Systems and Networks Communications (ICSNC), 2007, 7 Pages, IEEE Computer Society.

Mell et al., "The NIST Definition of Cloud Computing," National Institute of Standards and Technology, Sep. 2011, p. 1-3, Special Publication 800-145.

Shokri et al., "Anonymous Routing in MANET using Random Identifiers," Proceedings of the Sixth International Conference on Networking (ICN'07), 2007, 5 Pages, IEEE Computer Society.

Verma et al., "Network Science for Military Coalition Operations: Information Exchange and Interaction," ACM SIGSOFT Software Engineering Notes, Nov. 2011, p. 30, vol. 36, No. 6, Abstract Only.

* cited by examiner

DYNAMIC GENERATION OF GEOGRAPHICALLY BOUND MANET IDS

BACKGROUND

The present invention relates generally to the field of computing, and more particularly to mobile ad hoc networks.

A mobile ad hoc network (MANET) may refer to an emerging technology where mobile devices, such as smartphones and tablets, wirelessly connect to other devices within certain proximity. Therefore, the connection created between two devices may form an ad hoc network since the created network may be infrastructure-less and self-configuring between the devices within the network. For example, smartphone users moving about a city may form an ad hoc network based on each user's proximity to the other smartphone users within the city. Furthermore, devices within the network may share resources, such as data, without the need for a fixed infrastructure or phone network, such as fourth generation wireless technology.

SUMMARY

According to one embodiment, a method for generating a geographically-bound mobile ad hoc network identification. The method may include receiving, by a processor, a mobile ad hoc network request. The method may also include determining a plurality of geographic coordinates of a device associated with a current location of the device. The method may further include generating a mobile ad hoc network identification based on the determined plurality of geographic coordinates. The method may also include processing the received mobile ad hoc network request using the generated mobile ad hoc network identification.

According to another embodiment, a computer system for generating a geographically-bound mobile ad hoc network identification. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The computer system may include receiving a mobile ad hoc network request. The computer system may also include determining a plurality of geographic coordinates of a device associated with a current location of the device. The computer system may further include generating a mobile ad hoc network identification based on the determined plurality of geographic coordinates. The computer system may also include processing the received mobile ad hoc network request using the generated mobile ad hoc network identification.

According to yet another embodiment, a computer program product for generating a geographically-bound mobile ad hoc network identification. The computer program product may include one or more computer-readable storage devices and program instructions stored on at least one of the one or more tangible storage devices, the program instructions executable by a processor. The computer program product may include program instructions to receive a mobile ad hoc network request. The computer program product may also include program instructions to determine a plurality of geographic coordinates of a device associated with a current location of the device. The computer program product may further include program instructions to generate a mobile ad hoc network identification based on the determined plurality of geographic coordinates. The computer program product may also include program instructions to process the received mobile ad hoc network request using the generated mobile ad hoc network identification.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Figure 1:
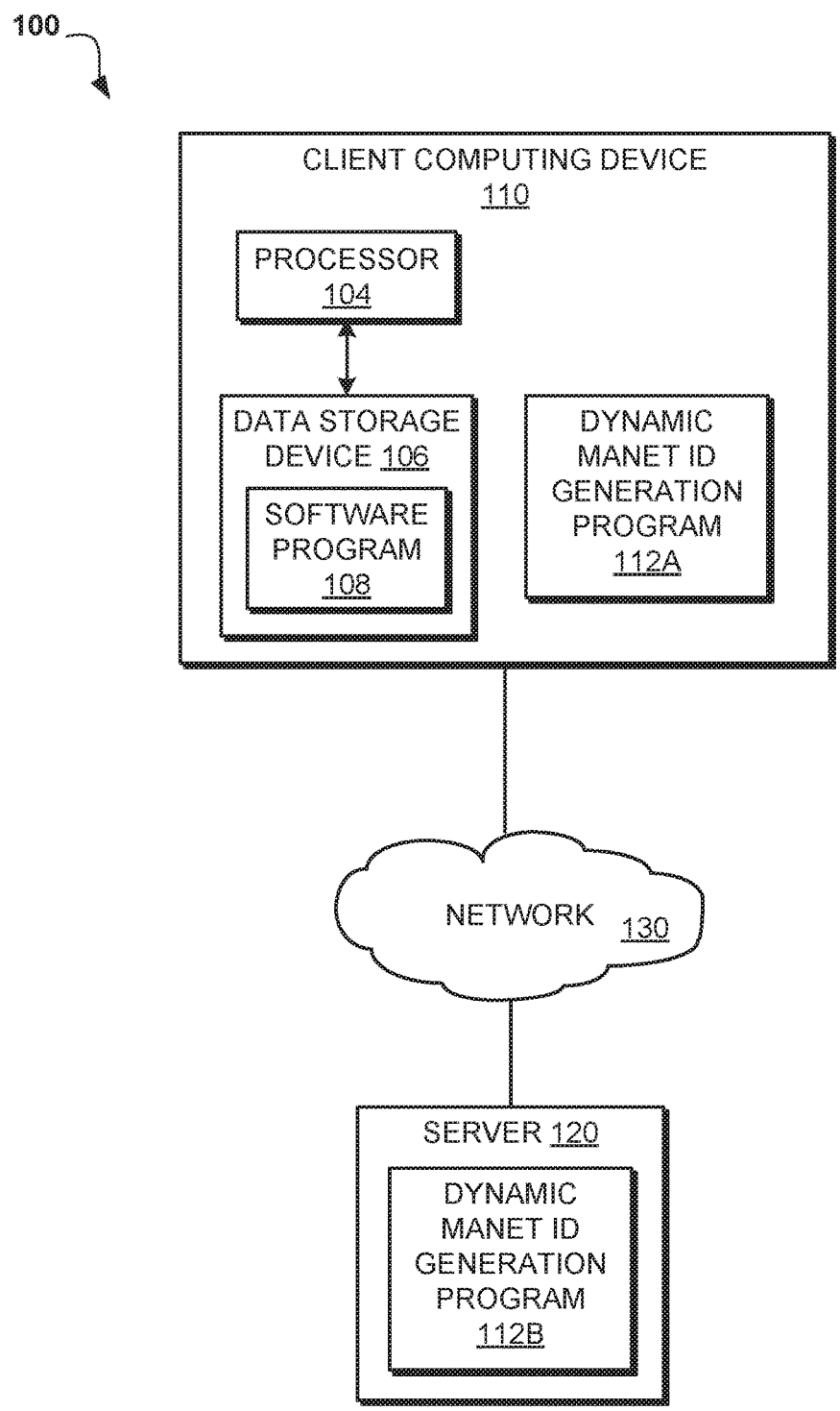
FIG. 1 is an exemplary networked computer environment, in accordance with one embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to mobile ad hoc networks (MANETs). The following described exemplary embodiments provide a system, method, and program product to, among other things, implement dynamic generation of geographically-bound MANET identification numbers (MANET IDs). Therefore, the present embodiment has the capacity to improve the technical field of MANETs by generating a predictable MANET ID for a device that is based on a geographic location without the need for a fixed infrastructure. More specifically, linking a MANET ID to a geographic location may allow sending devices to predict specific ad hoc network addresses and network identification numbers (IDs) based on a device's geographic location.

As previously described, a mobile ad hoc network (MANET) may refer to an emerging technology where mobile devices, such as smartphones and tablets, wirelessly connect to other devices within certain proximity. Therefore, the connection created between two devices may form an ad hoc network since the created network may be infrastructure-less and self-configuring between the devices within the network. For example, smartphone users moving about a city may form an ad hoc network based on each user's proximity to the other smartphone users within the city. Furthermore, devices within the network may share resources, such as data, without the need for a fixed infrastructure or phone network, such as fourth generation wireless technology. Additionally, transmitting data within ad hoc networks (i.e. inter-MANET) may require the target network to be known. For example, the target network may need to have a network prefix or a network identifier. When a MANET ID is known, data may be routed to that network.

When a mobile device chooses to connect to an ad hoc network, a scan is typically performed to search for adjacent members that may already be connected to a network. If no connected members are detected, the device may become the "seed", or "root", MANET node (MN) and a MANET ID may be generated that names the newly created ad hoc network. As other devices connect to the ad hoc network and become members themselves, the root MN and subsequently connected nodes adopt the generated MANET ID. Additionally, a single MN may be connected to more than one MANET. Such MNs may be referred to as gateway MNs.

A variety of methods exist to generate a MANET ID, such as using the media access control (MAC) address or the seed MN and a timestamp or a pseudo random number using a hashing algorithm. Once a device connects to such a MANET, the connecting device may adopt the generated MANET ID. Although using the MAC address of the seed MN and a timestamp guarantees a unique identifier, problems may arise during inter-MANET data transmissions since the sender may not be capable of predicting the root MAC address, timestamp, or pseudo random number used to generate the ID of the target MANET, which may periodically change due to the changing geographic location of the connecting device. Furthermore, MANET IDs generated in one of the above manners may not be associated with the geographic boundaries of the associated network. Therefore, a sender may not be able to determine a specific geographic location in which to address a transmission.

Additionally, MANETs are geographically bound by definition since each connecting device physically exists in the real world at geographic coordinates. At times, a sender may wish to transmit data to a specific location rather than a specific MANET ID. However, the sender may not be capable of predicting the MANET ID of a network potentially operating at a specific geographic location. As such, it may be advantageous, among other things, to implement a system that dynamically generates a predictable, geo-bound MANET ID such that an inter-MANET transmission may be addressed to a MANET that operates at a specific geographic location.

According to one embodiment, built-in global positioning system (GPS) technology may be used to determine the geographic location of a device in the process of connecting to a MANET. Using the determined geographic location information, a MANET ID may be generated that matches the device location. Furthermore, each connecting device may generate a MANET ID for itself rather than adopting the MANET ID of nearby devices. Additionally, the generated MANET ID may be modified according to the movement of the device. Therefore, clusters of "micro" MANETs may be created that share a MANET ID. A "micro" MANET may merge with a neighboring MANET assigned a similar MANET ID, thus allowing for inter-MANET transmissions by general or specific geographic location. Additionally, by using geographically-bound MANET IDs, the present embodiment may allow for intra-MANET transmissions that many typical MANET transmission systems are incapable of performing.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product that provides for dynamic generation of MANET IDs to facilitate inter-MANET data transmission through predictive naming and geographic locating. Furthermore, the dynamic MANET ID generation system may allow for MANET identity granularity, limitation of broadcast traffic, data transmission to general and specific geographic locations, predictive MANET identification, and inter-MANET transmission addressing.

Referring to FIG. 1, an exemplary networked computer environment 100 is depicted, in accordance with one embodiment. The networked computer environment 100 may include a client computing device 110 and a server 120 interconnected via a communication network 130. According to at least one implementation, the networked computer environment 100 may include a plurality of client computing devices 110 and servers 120, only one of each being shown for illustrative brevity.

The communication network 130 may include various types of communication networks, such as a wide area network (WAN), local area network (LAN), a telecommunication network, a wireless network, a public switched network and/or a satellite network. The communication network 130 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The client computing device 110 may include a processor 104 and a data storage device 106 that is enabled to host a software program 108 and a Dynamic MANET ID Generation Program 112A and communicate with the server 120 via the communication network 130, in accordance with one embodiment of the invention. The client computing device 110 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 110 may include internal components 402a and external components 404a, respectively.

The server computer 120 may be a laptop computer, netbook computer, personal computer (PC), a desktop computer, or any programmable electronic device capable of hosting a Dynamic MANET ID Generation Program 112B and communicating with the client computing device 110 via the communication network 130, in accordance with embodiments of the invention. As will be discussed with reference to FIG. 4, the server computer 120 may include internal components 402b and external components 404b, respectively. The server 120 may also operate in a cloud computing service model, such as Software as a Service (SaaS), Platform as a Service (PaaS), or Infrastructure as a Service (IaaS). The server 120 may also be located in a cloud computing deployment model, such as a private cloud, community cloud, public cloud, or hybrid cloud.

According to the present embodiment, the Dynamic MANET ID Generation Program 112A, 112B may be a program capable of creating or predicting a MANET ID based on the geographic location of a device. Furthermore, the Dynamic MANET ID Generation Program may be capable of accessing and utilizing GPS information received or produced by the client computing device 110 or the server 120 when creating or predicting the MANET ID. The Dynamic MANET ID Generation Program 112A, 112B is explained in further detail below with respect to FIG. 2.

Figure 2:
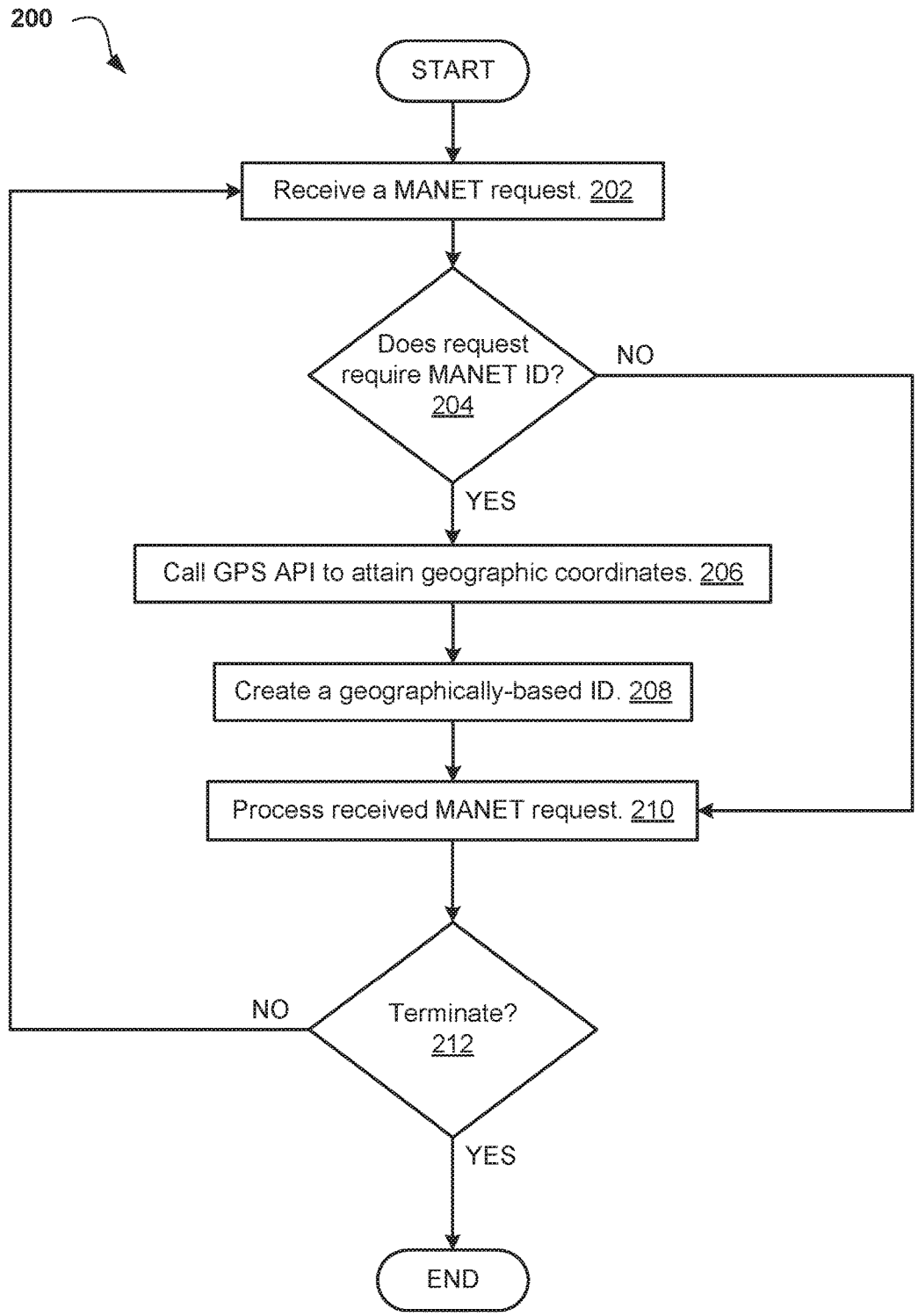
FIG. 2 illustrates an operational flowchart of the steps carried out by a dynamic MANET ID generation program, in accordance with one embodiment of the present invention.

Referring now to FIG. 2, an operational flowchart 200 of the steps carried out by a dynamic MANET ID generation program is depicted, in accordance with one embodiment of the present invention. At 202, the Dynamic MANET ID Generation Program 112A, 112B (FIG. 1) receives a MANET request. When a device, such as client computing device 110 (FIG. 1) or server 120 (FIG. 1), attempts to connect to a MANET or otherwise process data through a MANET, such as a routing query, a MANET request may be transmitted from the requesting device to a device already connected to the MANET. For example, if User A is travelling within a city and comes within range of a MANET to which User B's tablet is a mobile node (i.e. connected), User A's mobile phone may attempt to connect to the MANET by transmitting a connection request to User B's tablet. User B's tablet, as a mobile node of the MANET, may then receive and process the connection request from User A's mobile phone.

Next at 204, the Dynamic MANET ID Generation Program 112A, 112B (FIG. 1) determines whether the received MANET request requires a MANET ID. According to one implementation, the method may continue along the operational flowchart 200, if the received MANET request requires a MANET ID. If the Dynamic MANET ID Generation Program 112A, 112B (FIG. 1) determines the received MANET request does require a MANET ID (step 204, "YES" branch), the Dynamic MANET ID Generation Program 112A, 112B (FIG. 1) may continue to step 206 to call a GPS application programming interface (API) to attain geographic coordinates. If the Dynamic MANET ID Generation Program 112A, 112B (FIG. 1) determines the received MANET request does not require a MANET ID (step 204, "NO" branch), the Dynamic MANET ID Generation Program 112A, 112B (FIG. 1) may advance to step 210 to process the received MANET request.

Then at 206, the Dynamic MANET ID Generation Program 112A, 112B (FIG. 1) calls the GPS API to attain geographic coordinates for the device. If the Dynamic MANET ID Generation Program 112A, 112B (FIG. 1) determines the received MANET request requires a MANET ID to join the MANET, the Dynamic MANET ID Generation Program 112A, 112B (FIG. 1) may call the GPS API to attain the geographic coordinates for the device. Since the nature of MANETs requires each MANET to be geographically-bound, each device connecting to a MANET may exist at physical geographic coordinates. Therefore, a device wishing to connect to a particular MANET may retrieve the current physical geographic coordinates of the device using the mobile devices GPS capabilities. For example, if User A requests to join the MANET to which User B's device is connected, User A's mobile phone may send a call to the global positioning system within User A's mobile phone to determine the current geographic coordinates for User A's mobile phone.

Next at 208, the Dynamic MANET ID Generation Program 112A, 112B (FIG. 1) generates a geographically-based MANET ID. Once the GPS API returns the current geographic coordinates of the connecting device, the Dynamic MANET ID Generation Program 112A, 112B (FIG. 1) may generate a geographically-based MANET for the connecting device using the mobile device's current geographic coordinates. The Dynamic MANET ID Generation Program 112A, 112B (FIG. 1) may develop a distinct ID for the connecting device that is depicted in CDDMMcdddmm format where "C" may be the compass direction of the latitude, "DD" may be the degrees of latitude (e.g. 0° to 90°), "MM" may be the minutes of latitude (0° to 99°), "c" may be the compass direction of the longitude, "ddd" may be the degrees of longitude (0° to 180°), and "mm" may be the minutes of longitude (0° to 99°). For example, if User A's mobile device is located in Perth, Western Australia, the current geographic coordinates of User A's mobile device may be 31.9522° S, 115.8589° E. Therefore, the Dynamic MANET ID Generation Program 112A, 112B (FIG. 1) may generate a MANET ID for User A's mobile device of S3195E11585. Similarly, if User A's mobile device is located in Fremantle, Western Australia, the current geographic coordinates of User A's mobile device may be 32.0569° S, 115.7439° E. Therefore, the Dynamic MANET ID Generation Program 112A, 112B (FIG. 1) may generate a MANET ID for User A's mobile device of S3205E11574. Furthermore, as the mobile device (i.e. the mobile node) changes geographic locations, the generated MANET ID may not change unless the MANET ID is queried to satisfy a MANET request, such as a connection request to a different MANET or a routing query. Once a MANET request is received, the Dynamic MANET ID Generation Program 112A, 112B (FIG. 1) may regenerate the MANET ID of the mobile node. Additionally, the Dynamic MANET ID Generation Program 112A, 112B (FIG. 1) may manipulate the generated MANET ID through transposition, translation, encryption, hashing or other various method of simple arrangement or derivation.

The Dynamic MANET ID Generation Program 112A, 112B (FIG. 1) may utilize source code written for a programming language, such as C, Ruby, and JavaScript. For example, the Dynamic MANET ID Generation Program 112A, 112B (FIG. 1) may utilize the following source code written in the C programming language to generate the geographically-bound MANET ID:

```
#define HOURS 1
#define MINUTES 2
#define SECONDS 3
#define SUCCESS 0
int rc;
char manetID[12];
int granularity;
granularity = MINUTES;
rc = GetMANETID(manetID, granularity);
if ( rc == SUCCESS )
{
    [ use manetID here ]
}
```

Then at 210, the Dynamic MANET ID Generation Program 112A, 112B (FIG. 1) processes the received MANET request using the generated MANET ID. Once the geographically-bound MANET ID has been created, the Dynamic MANET ID Generation Program 112A, 112B (FIG. 1) may process the MANET request. For example, once the MANET ID for a mobile device has been generated, the Dynamic MANET ID Generation Program 112A, 112B (FIG. 1) may connect the mobile device to the appropriate MANET or route the request according to the routing query.

Next at 212, the Dynamic MANET ID Generation Program 112A, 112B (FIG. 1) determines whether to terminate. According to one implementation, the method may continue along the operational flowchart 200, if the Dynamic MANET ID Generation Program 112A, 112B (FIG. 1) determines should terminate. If the Dynamic MANET ID Generation Program 112A, 112B (FIG. 1) determines to terminate (step 212, "YES" branch), the Dynamic MANET ID Generation Program 112A, 112B (FIG. 1) may terminate. If the Dynamic MANET ID Generation Program 112A, 112B (FIG. 1) determines not to terminate (step 212, "NO" branch), the Dynamic MANET ID Generation Program 112A, 112B (FIG. 1) may return to step 202 to receive a MANET request.

It may be appreciated that FIG. 2 provides only an illustration of one implementation and does not imply any limitations with regard to how different embodiments may be implemented. Many modifications to the depicted environments may be made based on design and implementation requirements. For example, the order of the components of the MANET ID may be in any order of latitudinal compass direction, degrees of latitude, minutes of latitude, longitudinal compass direction, degrees of longitude, and minutes of longitude. Additionally, a user configurable setting may exist to determine the granularity of the MANET ID. For example, the user may configure the granularity of the generated MANET ID to include the seconds of latitude and seconds of longitude desired.

Figure 3:
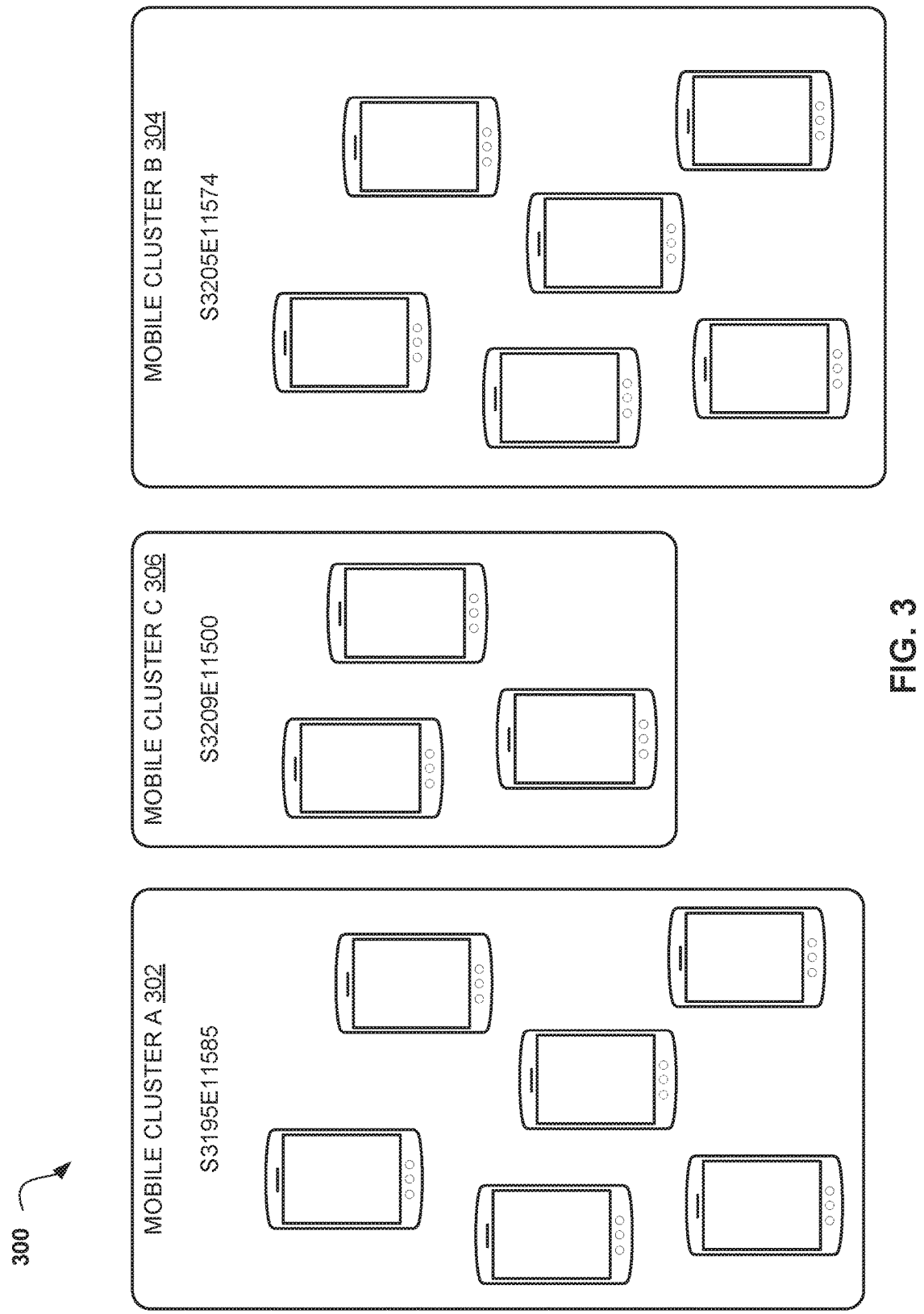
FIG. 3 is a functional block diagram of mobile device clusters utilizing dynamic generation of MANET IDs to bind a network identity to a geographic location, in accordance with one embodiment of the present invention.

FIG. 3 is a functional block diagram 300 of mobile device clusters utilizing dynamic generation of MANET IDs to bind a network identity to a geographic location, in accordance with one embodiment of the present invention. Mobile cluster A 302 may be located within Perth, Western Australia around the geographic coordinates 31.9522° S, 115.8589° E. Therefore, the Dynamic MANET ID Generation Program 112A, 112B (FIG. 1) may generate a MANET ID of S3195E11585 for each mobile device within mobile cluster A 302. Furthermore, mobile cluster B 304 may be located within Fremantle, Western Australia around the geographic coordinates 32.0569° S, 115.7439° E. Therefore, the Dynamic MANET ID Generation Program 112A, 112B (FIG. 1) may generate a MANET ID of S3205E11574 for each mobile device within mobile cluster B 304.

Since only one degree and 90 minutes latitude and 11 minutes longitude separate the geographic coordinates for mobile cluster A 302 and mobile cluster B 304, several micro-MANETs, such as mobile cluster C 306, may exist between mobile cluster A 302 and mobile cluster B 304. Therefore, the micro-MANETs between mobile cluster A 302 and mobile cluster B 304 may be utilized to link mobile cluster A 302 and mobile cluster B 304 into one or more larger MANETs.

In at least one embodiment, the Dynamic MANET ID Generation Program 112A, 112B (FIG. 1) may be capable of transmitting messages to MANETs based on the geographically-bound MANET ID. To accomplish such transmissions, the Dynamic MANET ID Generation Program 112A, 112B (FIG. 1) may utilize the generated MANET ID as an address to send the transmission. Furthermore, the Dynamic MANET ID Generation Program 112A, 112B (FIG. 1) may implement wildcarding of components of the generated MANET ID to send a transmission to a specific location. Wildcarding may refer to the process of using a destination MANET ID with a larger granularity, such as an address omitting the minutes of latitude and minutes of longitude, to send a transmission. Therefore, the transmission may be sent to a wider geographic area, thereby, allowing the message to be received by a greater number of MANETs. Furthermore, a variable character, such as an asterisk, an apostrophe, an exclamation point, a question mark, or a dollar sign, may be inserted in a transmission address to represent a wildcard figure or integer. For example, if a transmission is addressed to S31E115, the transmission may be sent to any MANET within the geographic location of 31 degrees south latitude and 115 degrees east longitude without regard to the minutes of latitude and minutes of longitude assigned to the recipient MANET.

Additionally, the Dynamic MANET ID Generation Program 112A, 112B (FIG. 1) may allow for limited broadcast within a MANET by restricting propagation within geographic or MANET ID boundaries. Furthermore, since the Dynamic MANET ID Generation Program 112A, 112B (FIG. 1) may generate a MANET ID that is bound to the geographic location, inter-MANET transmissions may be addressed using predicted target MANET IDs in advance to assure the geographic location of the target MANET.

Figure 4:
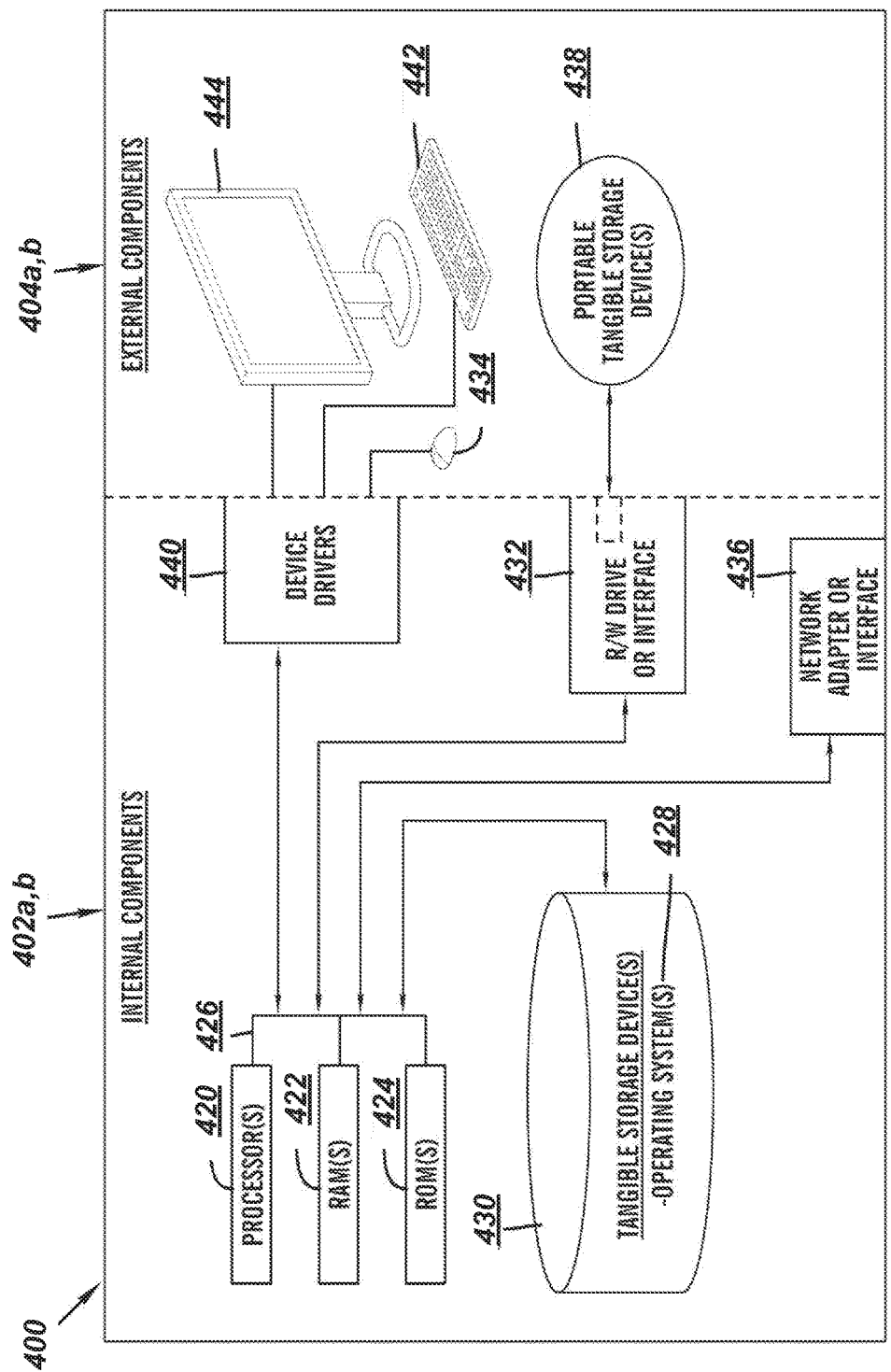
FIG. 4 is a block diagram of internal and external components of computers and servers depicted in FIG. 1 according to at least one embodiment.

FIG. 4 is a block diagram 400 of internal and external components of the client computing device 110 and the server 120 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 110 (FIG. 1) and the server 120 (FIG. 1) may include respective sets of internal components 402 a,b and external components 404 a,b illustrated in FIG. 4. Each of the sets of internal components 402 include one or more processors 420, one or more computer-readable RAMs 422 and one or more computer-readable ROMs 424 on one or more buses 426, and one or more operating systems 428 and one or more computer-readable tangible storage devices 430. The one or more operating systems 428, the Dynamic MANET ID Generation Program 112A (FIG. 1) in the client computing device 110 (FIG. 1), and the Dynamic MANET ID Generation Program 112B (FIG. 1) in the server 120 (FIG. 1) are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the Dynamic MANET ID Generation Program 112A, 112B (FIG. 1), can be stored on one or more of the respective portable computer-readable tangible storage devices 438, read via the respective R/W drive or interface 432 and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The Dynamic MANET ID Generation Program 112A (FIG. 1) in the client computing device 110 (FIG. 1) and the Dynamic MANET ID Generation Program 112B (FIG. 1) in the server 120 (FIG. 1) can be downloaded to the client computing device 110 (FIG. 1) and the server 120 (FIG. 1) from an external computer via a network (for example, the Internet, a local area network or other, wide area network) and respective network adapters or interfaces 436. From the network adapters or interfaces 436, the Dynamic MANET ID Generation Program 112A (FIG. 1) in the client computing device 110 (FIG. 1) and the Dynamic MANET ID Generation Program 112B (FIG. 1) in the server 120 (FIG. 1) are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432 and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
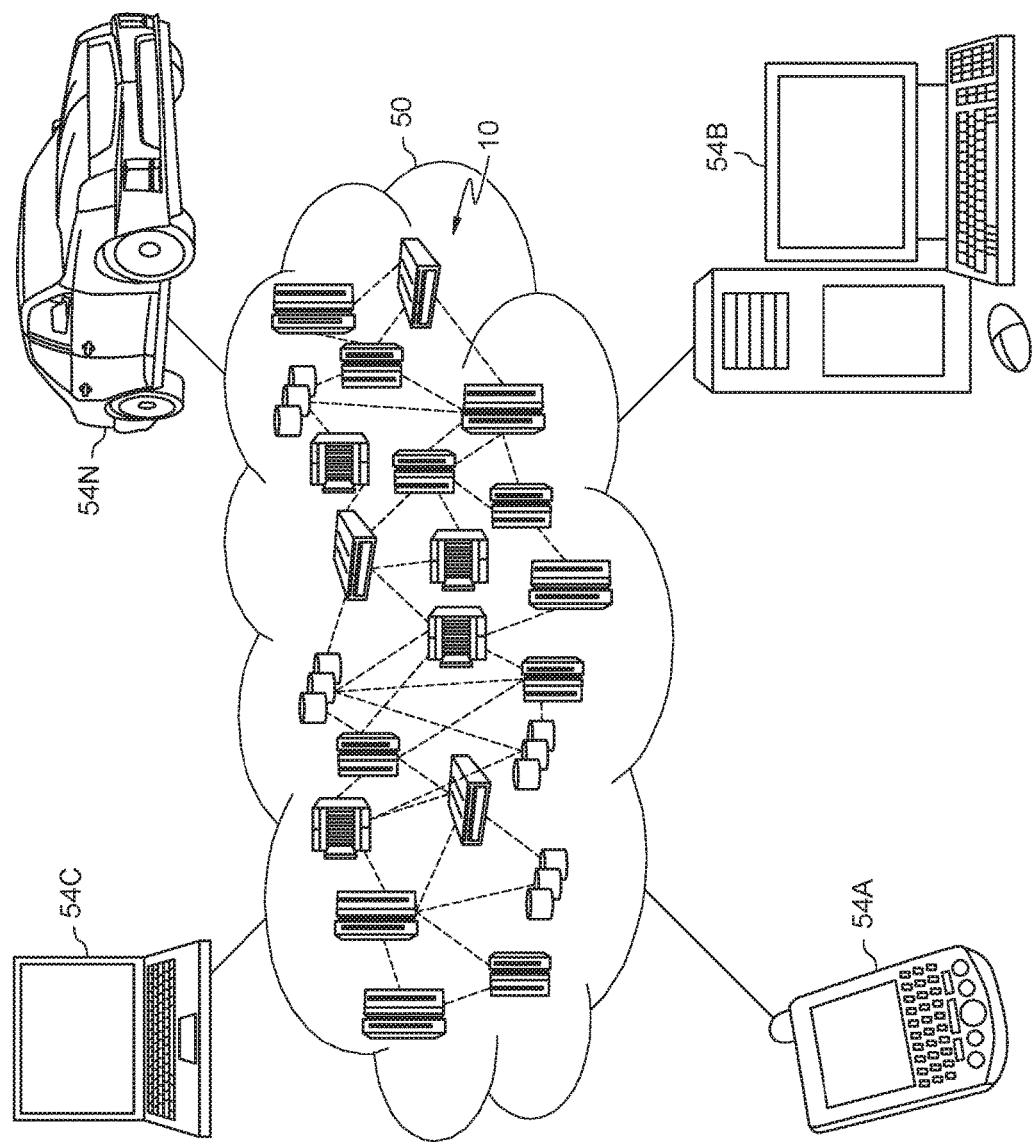
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
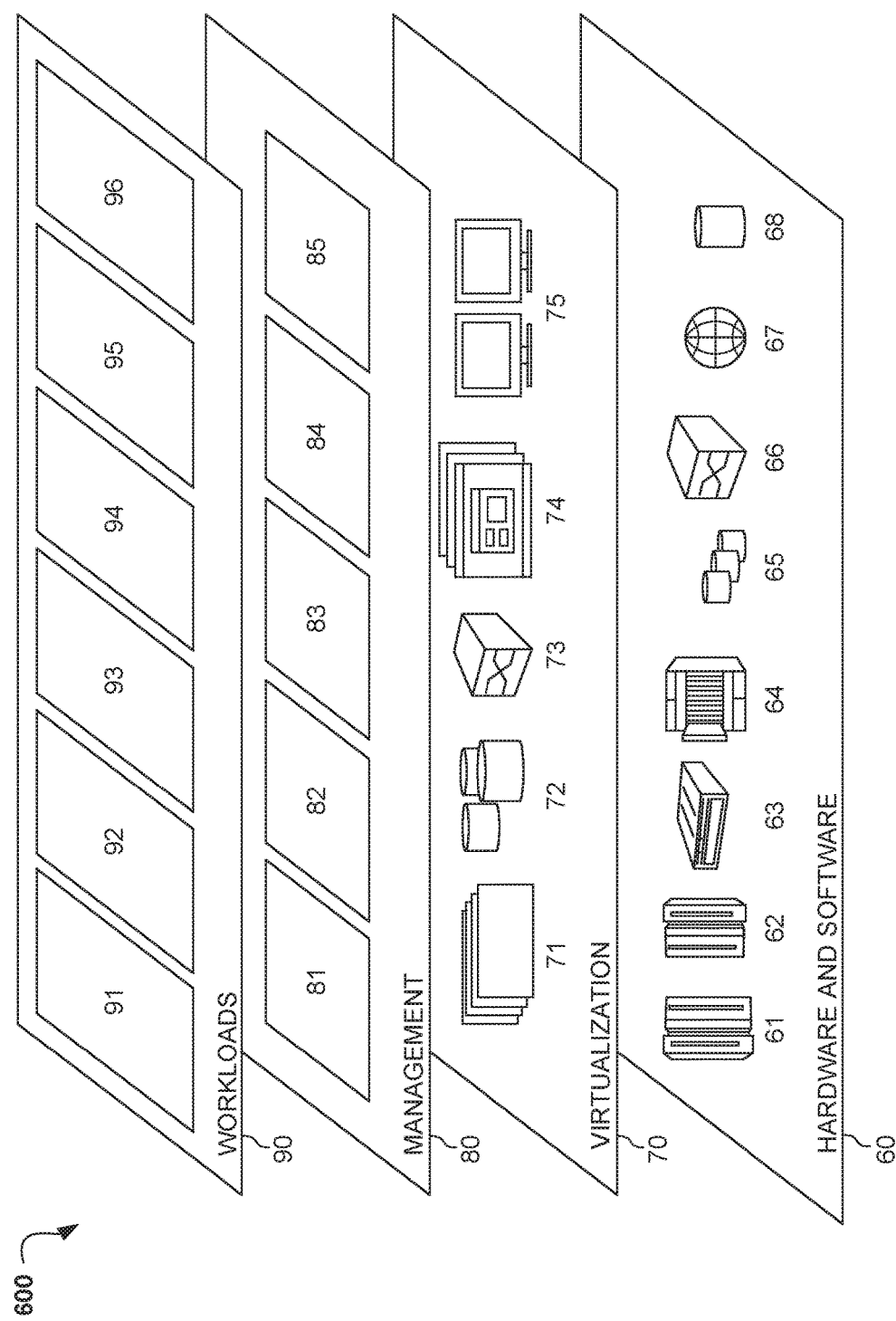
FIG. 6 depicts abstraction model layers according to an embodiment of the present invention.

Referring now to FIG. 6 a set of functional abstraction layers 600 provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic MANET ID generation 96. Dynamic MANET ID generation 96 may refer to utilizing GPS technology to determine the geographic location of a device and generate a MANET ID for that device based on the determined geographic location.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for generating a geographically-bound mobile ad hoc network identification, the method comprising:
   receiving, by a processor, a mobile ad hoc network request;
   determining a plurality of geographic coordinates of a device associated with a current location of the device;
   generating a mobile ad hoc network identification based on the determined plurality of geographic coordinates; and
   processing the received mobile ad hoc network request using the generated mobile ad hoc network identification.

2. The method of claim 1, wherein generating the mobile ad hoc network identification includes ordering a plurality of components associated with the determined plurality of geographic coordinates.

3. The method of claim 2, wherein the ordered plurality of components includes at least one of a latitudinal compass direction, a plurality of degrees latitude, a plurality of minutes latitude, a longitudinal compass direction, a plurality of degrees longitude, or a plurality of minutes longitude.

4. The method of claim 1, wherein determining the plurality of geographic coordinates is accomplished using a global positioning system.

5. The method of claim 1, further comprising:
   generating an updated mobile ad hoc network identification based on a change in the current location of the device.

6. The method of claim 1, wherein generating the mobile ad hoc network identification includes utilizing at least one of a transposition, a translation, an encryption, or a hashing.

7. The method of claim 1, wherein the generated mobile ad hoc network identification includes a user configurable granularity setting.

8. The method of claim 1, further comprising:
   determining a mobile ad hoc network identification associated with a recipient device based on a predicted geographic location of the recipient device; and
   transmitting a plurality of data to the recipient device based on the determined mobile ad hoc network identification.

9. The method of claim 8, wherein determining the mobile ad hoc network identification associated with the recipient device includes wildcarding at least one geographic component within a plurality of geographic components associated with the predicted geographic location of the recipient device.

\* \* \* \* \*